United States Patent [19]

Lohner

[11] 4,356,995

[45] Nov. 2, 1982

[54] STORAGE CARRIER FOR FERMENTATION INTERRUPTERS

[76] Inventor: Gerd Lohner, Schulstrasse 9, D-5480 Remagen 3, Fed. Rep. of Germany

[21] Appl. No.: 291,082

[22] Filed: Aug. 7, 1981

[30] Foreign Application Priority Data

Aug. 7, 1980 [DE] Fed. Rep. of Germany ....... 3029919

[51] Int. Cl.³ .............................................. B29C 1/00
[52] U.S. Cl. .................................... 249/112; 249/134
[58] Field of Search ............................... 249/112, 134

[56] References Cited

U.S. PATENT DOCUMENTS

| | | | |
|---|---|---|---|
| 1,811,566 | 6/1931 | Scott | 249/112 |
| 2,174,425 | 9/1939 | Schlumbohen | 249/112 X |
| 3,128,725 | 4/1964 | Becker et al. | 249/112 X |
| 3,910,547 | 10/1975 | Varriano | 249/112 X |
| 3,940,232 | 2/1976 | Stock | 249/112 X |
| 4,038,014 | 7/1977 | Dussa et al. | 249/112 X |
| 4,116,415 | 9/1978 | Wald | 249/112 X |

*Primary Examiner*—J. Howard Flint, Jr.

*Attorney, Agent, or Firm*—Cushman, Darby & Cushman

[57] ABSTRACT

The invention is referring to a storage carrier to be used in a fermentation interrupter for the production of rolls or similar products with a pattern. The first stage of such rolls are dough crudes in form of dough cuts whose ends are rolled or wrapped up towards the center, where they are forming a contact seam. It is necessary that during the later baking process this contact seam is ripping up or cracking and there is resulting the so called pattern (Ausbund). The possibility to produce such rolls from the dough crudes is depending on different effects during the procedure in the fermentation interrupters. For ensuring on the one side a sufficient raising effect and to prevent on the other side the access of too much air humidity, it is proposed to provide a storage carrier with a supporting framework having deepenings for taking up the dough crudes as well as a textile cover and a foam plastic layer between the supporting framework and the textile cover. Preferably the foam plastic layer and the textile cover are formed of one piece.

5 Claims, 3 Drawing Figures

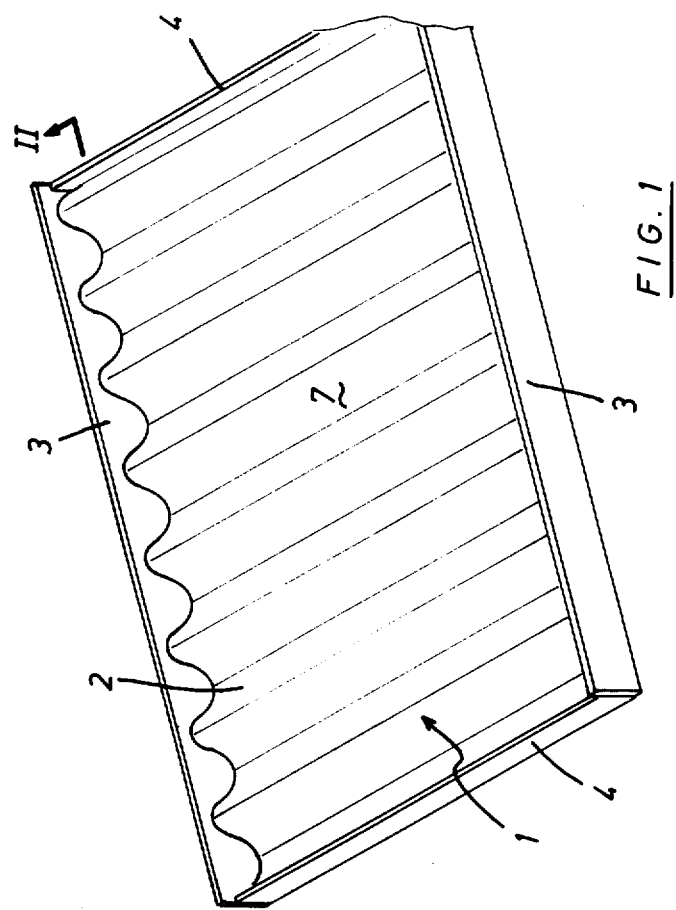
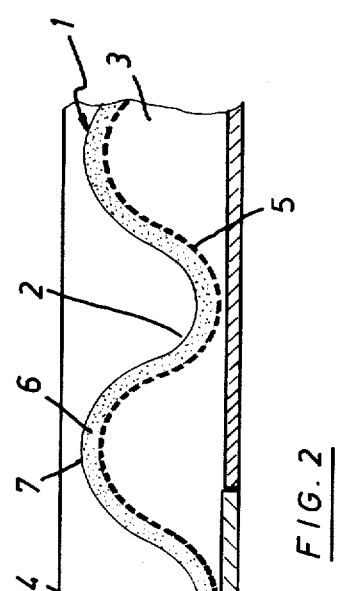
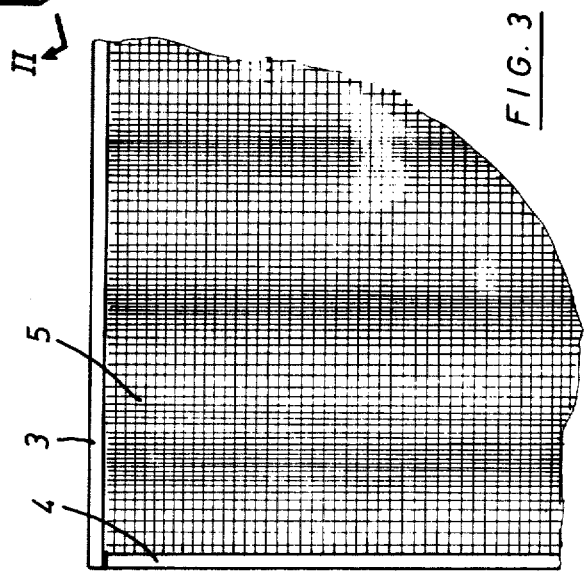

STORAGE CARRIER FOR FERMENTATION INTERRUPTERS

DESCRIPTION

The invention is referring to a storage carrier usable in fermentation interrupters. The storage carrier according to the invention is used for the production of dough crudes for rolls or similar products with a pattern.

Rolls with a pattern, that are cut rolls—if they can be baked at once—are produced as follows: First of all the baking dough is produced in a dough machine. The baking dough is then put on a rolls machine which deliveres dough crudes. These are dough cuts whose ends are rolled or wrapped up towards the centre.

With this side showing a connection seam (the so called end) the dough crudes are set up on tilt boards made of wood, tilt boxes made of wood or similar storage carriers. Afterwards the storage carriers are covered with perforated plats—the later baking tins—, and are driven into a fermentation case and stored there for about 20 to 30 minutes. Afterwards they are tilted, whereby the dough crudes are transferred to the baking tins. Finally on these baking tins the dough crudes are transported into the oven where they are hold for about 18 to 20 minutes at an oven-temperature of mostly 230° C. to 250° C.

With the change of the baking tins the end of the dough curdes are getting upside. During the process of baking the connection seams are cracking and ripping up respectively and there is resulting the so called pattern which is wanted for cutted rolls or similar products as for example "Kaisersemmeln" (rolls with a starlike pattern).

With the adoption of a baking prohibition law for the night it is practically no longer possible to produce rolls in the conventional way. The baking prohibition says that preparations for the baking may start not before 3.30 h and with the actual baking not before 4.00 h. The described conventional preparations would take up one hours time until one could start with the actual baking so that the first baking could not happen at the earliest possible time. Further on it is necessary to have the rolls as early as possible ready for delivery and distribution so that for the baking there is only available a rather short period of time (maximum 1 to 2 hours). In this period os time is not is possible to produce a bigger amount of baker's wares in the conventional way. That is only possible, if time is exclusively used for baking and therefore always oven-prepared dough crudes should be at hand.

Nowadays such a procedure is only possible with fermentation interrupters. They replace the before mentioned fermentation cases. In the fermentation interrupters the dough crudes are cooled at first down to $-5°$ to $-7°$ C. and can be stored under this conditions up to 50 hours and even more hours. Before taking the dough crudes out of the baking there is a heating up to 30° C. going hand in hand with a relative atmospheric humidity of up to 90%.

By the use of such fermentation interrupters (for high production of baker's wares) there arises the following problem. The dough crudes connot be stored any longer inside on the conventional storage carries, namely on the tilt boards made of wood, tilt boxes made of wood and similar devices. It has been experienced that the underneath lying upon part of the dough crudes does not raise enough. Of course it is possible to tilt over the dough crudes on the later baking tins before the entrance in the fermentation interrupter. Under this condition the air necessary for the raising is reaching the whole surface. However with this air also the atmospheric humidity can get nearly on the complete surface. This way the dough crudes become more consistent and loose their tendency for cracking and ripping and as therefore it is impossible to produce baking wares with a pattern by help of fermentation interrupters.

It is object of the invention to provide a storage carrier usable in fermentation interrupters. The storage carrier (basis, bottom) is to be used for the production of rolls or similar products with a pattern.

This well-known, wide-spread and practically daily problem can be solved in a simple way according to the device of the invention by providing a storage carrier with a supporting framework with deepenings for taking up and/or holding of dough crudes, a textile cover and a foam plastic layer between the supporting framework and the textile (fabric) cover.

A storage bottom or carrier with a supporting frame with deepenings for dough crudes and a fabric cover is described in DE-GM No. 79 07 456, but for a completely other relation. With this device the creation of sweating spots on the rolls should be avoided. But this device is not provided and not suitable for the production of rolls with a pattern. On this device the dough crudes would lose the tendency for cracking and ripping as already described above.

The invention is basing on the disclosure that on the one side the admittance of humidity in the area of the later pattern must be vendered difficult, but a hermetic air seal is not allowed. Under consideration of this aim the invention is proposing firstly a supporting framework, which is causing the moulding and which is airpermeable in a high degree. The supporting framework is consisting primary of metallic materials, but also non-metallic are usable.

It is only necessary to maintain a minimum of form stability and furtheron flavour and taste neutrality. A special heat resistance is not necessary for the used workmaterial as it is practically used only at elevated room temperatures. As metall there can be used preferably precious metals or aluminium.

The supporting frame work can be of different forms, par example it can be a netting, a perforated plate etc. or composed of single wires, rods etc.

The critical conditions at the surface to be influenced are accomplished with help of a foam plastic layer and a textile cover. As a foam plastic layer there is used a commercial foam plastic product of some millimeter (for example 3 mm) thickness as it is used par example for the lining of clothes and furniture and for decoration. The foam plastic layer is having a sufficient porosity and it is supposed to be controlling the humidity. The textile cover can be a fabric and especially a cotton fabric, a fleece, a felt cloth or a similar product of some tenth millimeter thickness. It is creating hygienic, cleaning (washable) contact surface. Foam plastic layer and textile cover can be combined solvable by help of ribbons, loops, keepers ans similar parts with the supporting framework, but also they can be firmly combined as par example sticked, altached, sewed or affixed in a similar manner.

The storage carrier (storage bedding) is showing furtheron deepenings, whereby it is possible to obtain a partial enclosing of the dough crudes and it is also possible to develop the conditions and effects of the proposed structure. In the deepenings there can be arranged one or more dough crudes in a row. In the last case the deepenings are having the form of a groove.

A storage carrier according to the invention is replacing the conventional tilt boards made of wood or the similar devices and is showing to be an ideal "fermentation plate" to be used in fermentation interruptures. Furtheron it can be used in fermentation cases. After taking the dough crudes out of the fermentation interruptures, they are transferred on the baking tins by tilting them in the conventional way. Therefore it is before hand possible to prepare a mutual coordination between the storage carrier according to the invention and the baking tins i.e. a development of a tilting case.

It is advantageous to produce the supporting frame work from a streching metal. This metal is providing formstability and it is also highly air-permeable.

An appropriate strecking metal is having par example a thickness of 1 mm, a fillet width of 1,5 mm and a mesh diameter of 6×16 mm.

It is suitable to form the foam plastic layer as one piece. Such a material is par example a table protecting material which is used beneath the table-cover.

In a preferred example the foam plastic layer and the textile cover are having the following composition: 14 weight-% viscose, 30 weight-% polyurethane and 56 weight-% cotton.

It is advantageous to form the storage carrier as a tilt box or case.

In the following the invention is described by help of a drawing for a preferred practical example.

FIG. 1 is showing a perspective view of a tilt box designed as a storage carrier, FIG. 2 is showing an edge area of the object according to FIG. 1 in a sectional view along the line II—II and FIG. 3 is showing the object according to FIG. 2 in plan view without a textile cover and foam plastic layer or lining.

According to FIG. 1 a wave-like bent storage carrier 1 is showing groove-like deepenings 2 for taking up (of here not further described) dough crudes. The deepenings 2 are parallelly arranged to one another. The storage carrier is surrounded and enclosed by overtopping angular borders 3 and 4. Both the opposite angular borders 3 are a little bit higher than their adjacent angular borders 4. They are following to hold a baking tin for covering of the storage carrier on which later on the dough crudes may be given up. The storage carrier 1 is described as a tilt box.

Expeically FIG. 2 is describing that the storage carrier according to the invention is composed of a supporting framework 5, a foam plastic layer 6 and a textile cover 7. The supporting framework5 is described as a wire structure (compare also FIG. 3) which is supported by the horizontal sides of the agular borders 3 and 4. The foam plastic layer 6 and the textile cover 7 are formed in one piece and firmly connected with the supporting framework 5.

I claim:

1. Storage carriers for the use in fermentation interrupturs and for the production of rolls or similar products with a pattern, characterized by that the storage carrier is having a supporting framework (5) with deepenings (2) for taking up of dough crudes as well as a textile cover (7), and that between the supporting framework (5) and the textile cover (7) there is arranged a foam plastic layer or lining (6).

2. Storage carrier according to claim 1, wherein the supporting framework (5) is formed of a roll or draw metal.

3. Storage carrier according to claim 1 wherein the foam plastic layer (6) and the textile cover (7) are formed as one piece.

4. Storage carrier according to claim 3, wherein the foam plastic layer (6) and the textile cover are composed of 14 weight-% viscose, 30 weight-% polyurethane and 56 weight-% cotton.

5. Storage carrier according to claim 1, wherein the storage carrier is formed as a tilt box.

* * * * *